(12) United States Patent
Yoshikawa et al.

(10) Patent No.: US 9,952,458 B2
(45) Date of Patent: Apr. 24, 2018

(54) DISPLAY APPARATUS

(71) Applicant: Sakai Display Products Corporation, Sakai-shi, Osaka (JP)

(72) Inventors: Takahiro Yoshikawa, Sakai (JP); Kazuhiko Negoro, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/784,238

(22) PCT Filed: Mar. 27, 2014

(86) PCT No.: PCT/JP2014/058755
§ 371 (c)(1),
(2) Date: Oct. 13, 2015

(87) PCT Pub. No.: WO2015/145645
PCT Pub. Date: Oct. 1, 2015

(65) Prior Publication Data
US 2016/0291385 A1    Oct. 6, 2016

(51) Int. Cl.
*G02F 1/1333* (2006.01)
*G02F 1/1335* (2006.01)

(52) U.S. Cl.
CPC .. *G02F 1/133308* (2013.01); *G02F 1/133504* (2013.01); *G02F 1/133603* (2013.01); *G02F 1/133606* (2013.01); *G02F 1/133608* (2013.01); *G02F 2001/13332* (2013.01); *G02F 2001/133314* (2013.01); *G02F 2001/133317* (2013.01); *G02F 2001/133567* (2013.01)

(58) Field of Classification Search
CPC ... G02F 1/133608; G02F 2001/133314; G02F 2001/13332; G02F 2001/133567
See application file for complete search history.

(56) References Cited

U.S. PATENT DOCUMENTS

| | | | |
|---|---|---|---|
| 2008/0143918 A1* | 6/2008 | Kim | G02F 1/133608 349/58 |
| 2009/0010025 A1* | 1/2009 | Okita | G02F 1/133606 362/609 |
| 2009/0185100 A1 | 7/2009 | Matsuhira et al. | |
| 2012/0013824 A1* | 1/2012 | Yoshikawa | G02F 1/133608 349/62 |

(Continued)

FOREIGN PATENT DOCUMENTS

JP    H04-213425 A    8/1992
JP    2009-122160 A    6/2009
(Continued)

*Primary Examiner* — Elmito Breval
(74) *Attorney, Agent, or Firm* — Rudy J. Ng; Bret E. Field; Bozicevic, Field & Francis LLP

(57) ABSTRACT

A display apparatus, comprising: a light source emitting light; a display panel displaying an image on a front face of the display panel, and facing the light source; and a diffusion section arranged between the light source and the display panel, wherein the diffusion section includes a diffusion sheet-fixed to a circumferential portion of the display panel via a frame body, and facing the display panel with a distance between the diffusion sheet and the display panel, and an optical sheet arranged in a gap between the display panel and the diffusion sheet.

10 Claims, 6 Drawing Sheets

(56) References Cited

U.S. PATENT DOCUMENTS

| | | | | |
|---|---|---|---|---|
| 2013/0201663 A1* | 8/2013 | Cho | ................ | G02F 1/133608 |
| | | | | 362/97.2 |
| 2013/0301241 A1* | 11/2013 | Maeda | ................ | F21V 29/00 |
| | | | | 362/97.1 |
| 2014/0211121 A1* | 7/2014 | Cho | ................ | G02F 1/133603 |
| | | | | 349/58 |
| 2014/0368751 A1* | 12/2014 | Han | ................ | G02F 1/133308 |
| | | | | 349/12 |

FOREIGN PATENT DOCUMENTS

| | | | |
|---|---|---|---|
| JP | 2009-122655 A | 6/2009 | |
| JP | 2010-276857 A | 12/2010 | |

\* cited by examiner

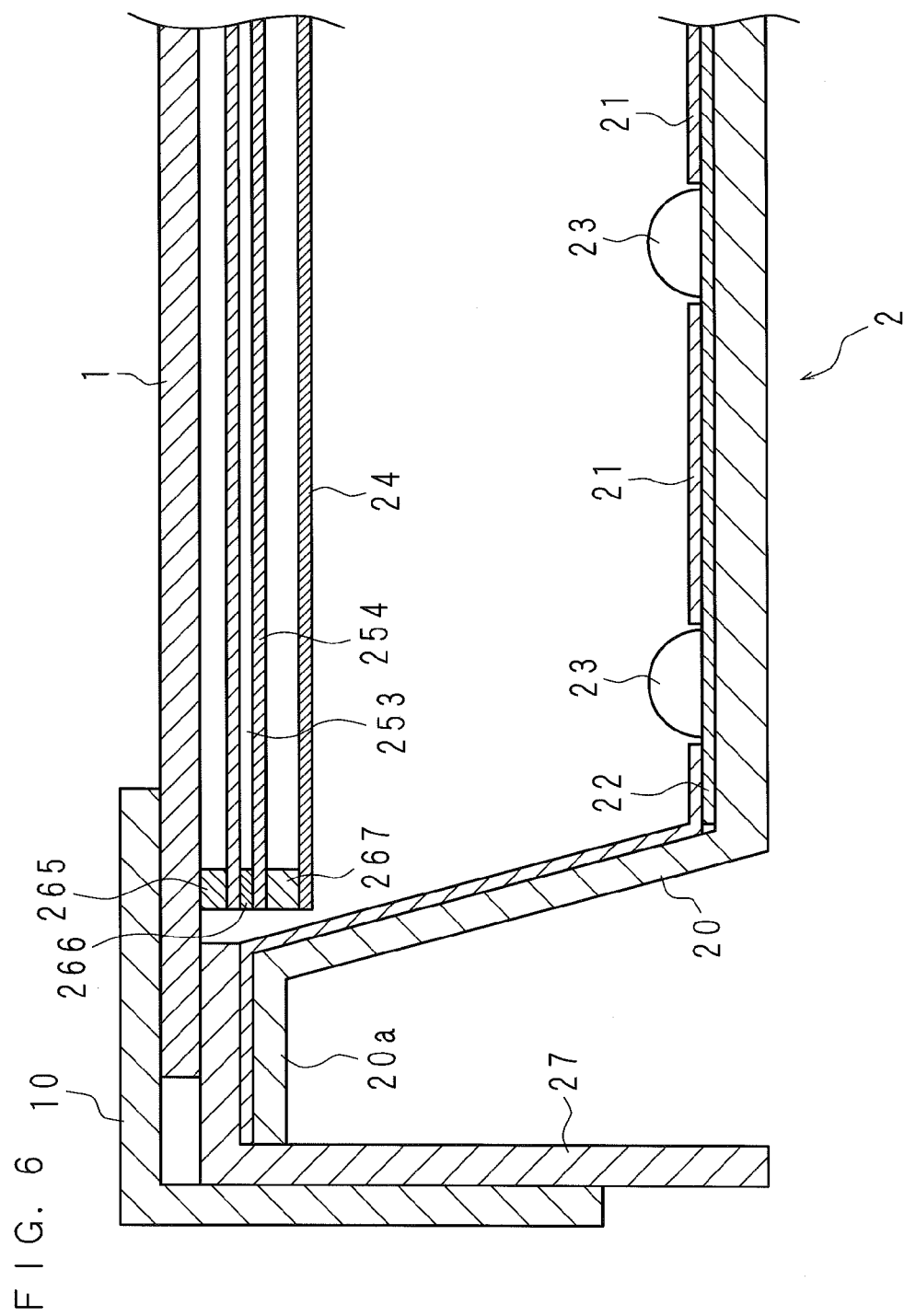

DISPLAY APPARATUS

CROSS-REFERENCE TO RELATED APPLICATIONS

This application is the national phase under 35 U.S.C. § 371 of PCT International Application No. PCT/JP2014/058755 which has an International filing date of Mar. 27, 2014 and designated the United States of America.

FIELD

The present invention relates to a display apparatus which displays an image on a display panel such as a liquid crystal panel, for example.

BACKGROUND

In recent years, a display apparatus comprising a liquid crystal panel as an image display section has been used widely. Such a display apparatus comprises a backlight arranged on a back face side of the liquid crystal panel.

The backlights of various types are employed. As a backlight of one type, a direct-type backlight is employed where light sources are arranged at positions facing the whole back face of the liquid crystal panel.

The display apparatus comprising the direct-type backlight further comprises: light sources aligned on a bottom face of a backlight chassis having a shallow-box shape; a liquid crystal panel covering an opening portion of the back light chassis; and a diffusion section arranged between the light source and the liquid crystal panel.

The diffusion section is provided with a diffusion plate supported by the back light chassis and with an optical sheet supported by the diffusion plate and arranged between the liquid crystal panel and the diffusion plate (for example, Japanese Patent Application Laid-Open No. 2009-122160).

This type of display apparatus diffuses light emitted from the light source by the diffusion plate and the optical sheet, modulates the diffused light by the liquid crystal panel, and transmits the light to display an image on a front face of the liquid crystal panel.

By the way, the diffusion plate is required for the conventional display apparatus.

The diffusion plate functions as a supporting member for the optical sheet constituting a part of the diffusion section, and has a certain amount of thickness so that the optical sheet is not slack.

For this reason, in a case where the display apparatus has a screen size of 60 inches, the diffusion plate has a weight of 2 to 3 kg.

Also, in a case where the display apparatus has a screen size of 80 inches, the diffusion plate has a weight over 5 kg.

Accordingly, the weight of the diffusion plate contributes to the inhibition of the reduction in weight of the large-sized display apparatus.

SUMMARY

According to an aspect of the embodiment, an apparatus comprising: a light source emitting light; a display panel displaying an image on a front face of the display panel, and facing the light source; and a diffusion section arranged between the light source and the display panel, wherein the diffusion section includes a diffusion sheet fixed to a circumferential portion of the display panel via a frame body, and facing the display panel with a distance between the diffusion sheet and the display panel, and an optical sheet arranged in a gap between the display panel and the diffusion sheet.

Additional objects and advantages of the embodiment will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 6 is a transverse sectional view by a line II-II of FIG. 1.

DESCRIPTION OF EMBODIMENTS

Embodiment 1

Hereinafter, the present invention will be described in detail with reference to the drawings showing Embodiments thereof. FIG. is a perspective view schematically showing an external appearance of a display apparatus according to Embodiment 1. The illustrated display apparatus comprises a liquid crystal panel 1 for image display (display panel) of a rectangular plate shape, and a backlight 2 which irradiates the liquid crystal panel 1 with light.

Figure 1:
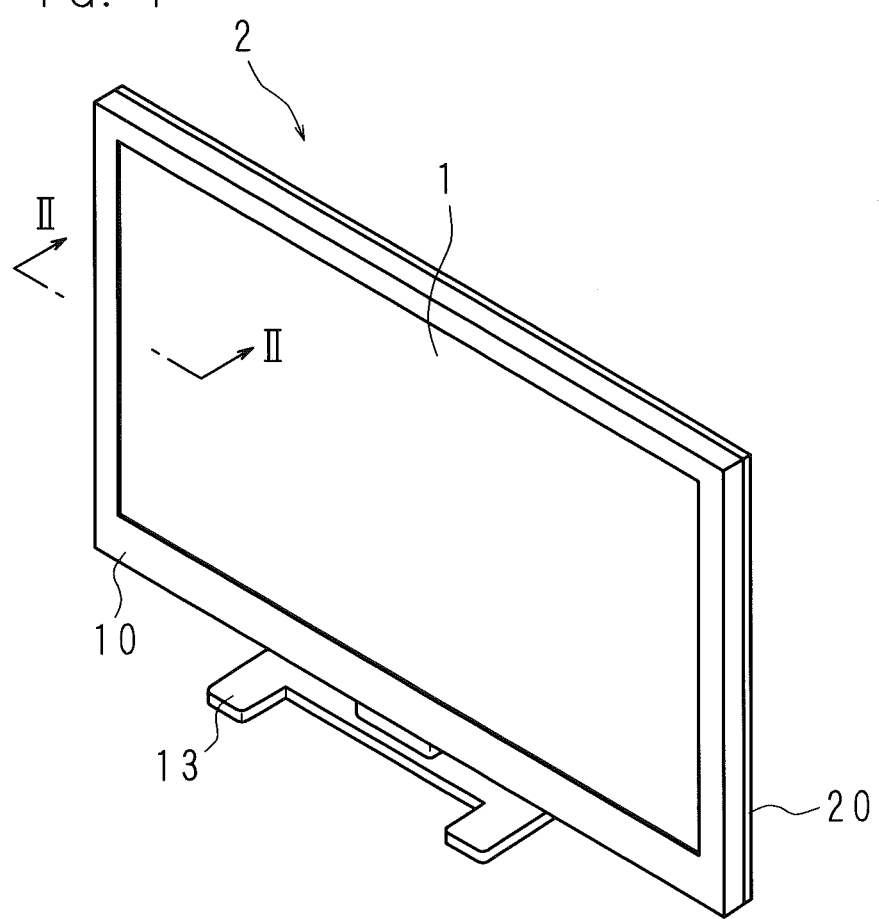
FIG. 1 is a perspective view schematically showing an external appearance of a display apparatus according to Embodiment 1.

To the liquid crystal panel 1, a front cabinet 10 of a rectangular frame shape is mounted so as to border a circumferential portion of a front face (image display surface) of the liquid crystal panel 1 over a suitable width. FIG. 1 shows the image display surface of the liquid crystal panel 1 which is exposed within a frame of the front cabinet 10. The backlight 2 is mounted on a back face side of the liquid crystal panel 1. The display apparatus further comprises a stand 13, is supported on a suitable placement plane via the stand 13, and is used with the image display surface of the liquid crystal panel 1 being maintained in a vertical posture, as shown in FIG. 1.

Figure 2:
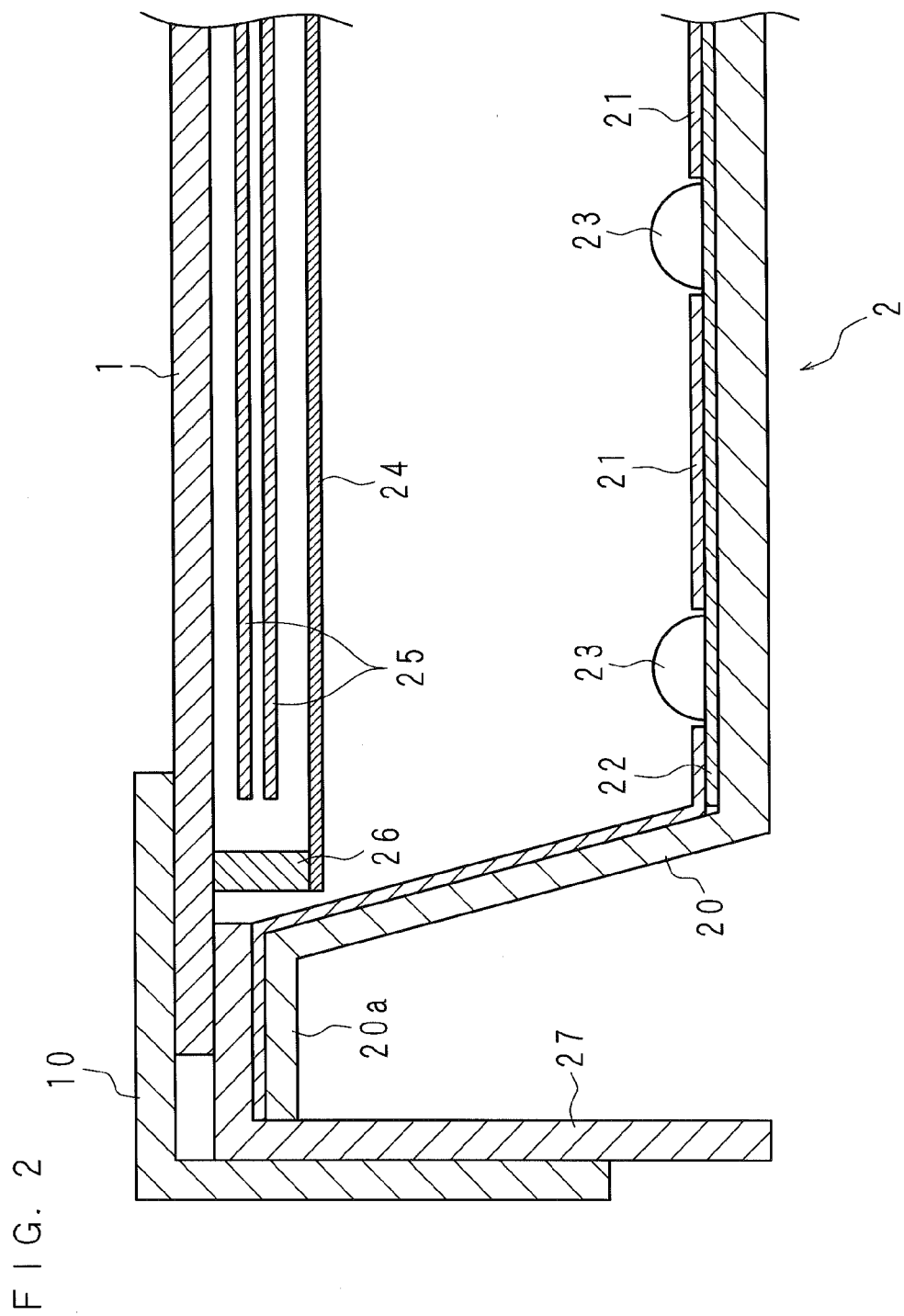
FIG. 2 is a transverse sectional view by a line II-II of FIG. 1.

FIG. 2 is a transverse sectional view by a line II-II of FIG. 1. As shown in FIG. 2, the backlight 2 is provided with a backlight chassis 20 of an outer case of a shallow-box shape and with a plurality of LEDs (Light Emitting Diodes) 23 arranged on a bottom plate of the backlight chassis 20. The LEDs 23 are aligned and mounted in vertical and lateral directions of one face of an LED substrate 22. The LEDs 23 are mounted to an inner face of the bottom plate of the backlight chassis 20 with a mounting face of the LED substrate 22 being directed to an opening side.

The inner face of the backlight chassis 20 is covered over the whole face including the bottom plate and side plates with a reflective sheet 21 made of resin having an excellent light reflectivity. The backlight chassis 20 is provided with a flange portion 20a arranged around the backlight chassis 20 so that the flange portion 20a projects from an opening portion thereof outward. A circumferential portion of the reflective sheet 21 is superposed on the flange portion 20a, and is held and mounted between the flange portion 20a and a holding frame 27 fitted onto an outside of the flange portion 20a. The reflective sheet 21 also covers the LEDs 23 arranged on the bottom plate of the backlight chassis 20. A plurality of the LED substrates 22 where the LEDs 23 are mounted are exposed on a surface side of the reflective sheet 21 through through-holes formed in their corresponding positions. That is, the plurality of LED substrates 22 are exposed to an opening side of the backlight chassis 20.

The liquid crystal panel 1 is mounted so that the front cabinet 10 bordering a circumferential portion of the front face side thereof is fitted onto the outside of the holding frame 27, and a circumferential portion of the back face thereof is in contact with the holding frame 27, and the liquid crystal panel 1 is held between the holding frame 27 and the front cabinet 10. The display apparatus comprises a diffusion section between the back face of the liquid crystal panel 1 mounted in this manner and the LEDs (light sources) 23 aligned on a bottom face of the backlight chassis 20.

The diffusion section is provided with one diffusion sheet 24 and two optical sheets 25. The diffusion sheet 24 is a sheet in which a resin fiber, such as PET (polyethylene terephthalate) or PC (polycarbonate), is intertwined in the form of a felt, equally diffuses incident light entering from one face therein, and emits it from the other face. The optical sheet 25 is a sheet made of a resin material, such as PET or PC, and has an optical action, such as a prism action or a lens action.

The diffusion sheet 24 is mounted to the back face of the liquid crystal panel 1 via a later-described frame body 26, and is supported so as to face the back face with a distance corresponding to a thickness of the frame body 26 therebetween. Two optical sheets 25 are supported so as to be superposed on the diffusion sheet 24 inside the frame body 26, and are arranged in a gap between the diffusion sheet 24 and the back face of the liquid crystal panel 1.

In the display apparatus configured as described above, light emitted from the LED 23 reaches the diffusion section directly or by reflecting on the reflective sheet 21, is diffuses by the diffusion sheet 24, and is condensed by the optical sheet 25, so that the back face of the liquid crystal panel 1 is irradiated with light. The liquid crystal panel 1 modulates irradiation light and causes it to transmit so as to display an image on the front face thereof.

Figure 3:
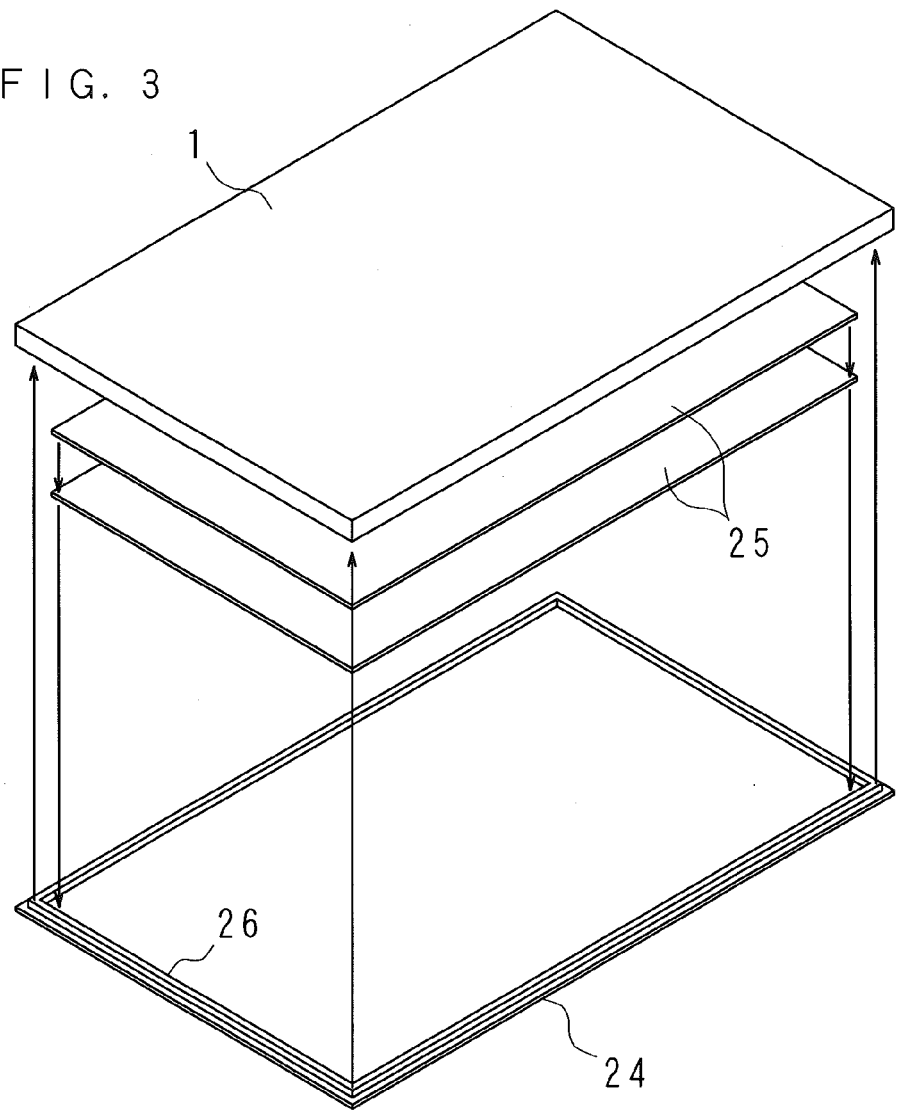
FIG. 3 is an explanatory view showing a mounting procedure of a diffusion sheet and an optical sheet.

FIG. 3 is an explanatory diagram showing the mounting procedure of the diffusion sheet 24 and the optical sheet 25. The diffusion sheet 24 has a rectangular shape. A vertical and lateral dimensions of the diffusion sheet 24 are smaller than a vertical and lateral dimensions of the liquid crystal panel 1 so that the liquid crystal panel 1 covers the diffusion sheet 24. The frame body 26 is a rectangular frame which has an opening in a central part thereof. A vertical and lateral dimensions of the frame body 26 are substantially the same as those of the diffusion sheet 24 so that the frame body 26 is arranged along a circumferential portion of the diffusion sheet 24. The frame body 26 is fixed to the circumferential portion of the diffusion sheet 24 by an adhesion layer. The optical sheet 25 has a rectangular shape. A vertical and lateral dimensions of the optical sheet 25 are slightly smaller than those of the opening of the frame body 26 so that the frame body 26 covers a circumferential portion of the optical sheet 25. The optical sheet 25 is fitted into the frame body 26 from a front face thereof and thereby is arranged on a front face of the diffusion sheet 24. The diffusion sheet 24 is fixed to the back face of the liquid crystal panel 1 throughout the circumferential portion via the frame body 26 by an adhesion layer.

Moreover, the display apparatus is configured so that the liquid crystal panel 1 is placed on the holding frame 27, the front cabinet 10 is fitted onto the outside of the holding frame 27, and the liquid crystal panel 1 is held between the holding frame 27 and the front cabinet 10 to cover the opening portion of the backlight chassis 20.

The diffusion sheet 24 is fixed to the back face of the liquid crystal panel 1 throughout the circumferential portion via the frame body 26. Thereby, the diffusion sheet 24 is suspended by the liquid crystal panel 1 of a supporting member with a distance between the diffusion sheet 24 and the back face of the liquid crystal panel 1. The diffusion sheet 24 suspended in this manner is a thin sheet, but it can function as a supporting member of the optical sheet 25. The display apparatus is arranged between the LED 23 functioning as the light source and the liquid crystal panel 1, and the diffusion section which diffuses light emitted from the LED 23 to irradiate the liquid crystal panel 1 with the light can be provided with three sheets of the diffusion sheet 24 and the optical sheets 25 and 25. This eliminates the need for a thick diffusion plate in the display apparatus. For this reason, the display apparatus can support the diffusion sheet 24 with the liquid crystal panel 1, thereby the weight of the display apparatus can be reduced without the diffusion plate.

It should be noted that the frame body 26 is fixed to the diffusion sheet 24 and the liquid crystal panel 1 with a double-sided tape, an adhesive, etc. in this Embodiment, but it may also be fixed to the diffusion sheet 24 and the liquid crystal panel 1 by welding.

Embodiment 2

Figure 4:
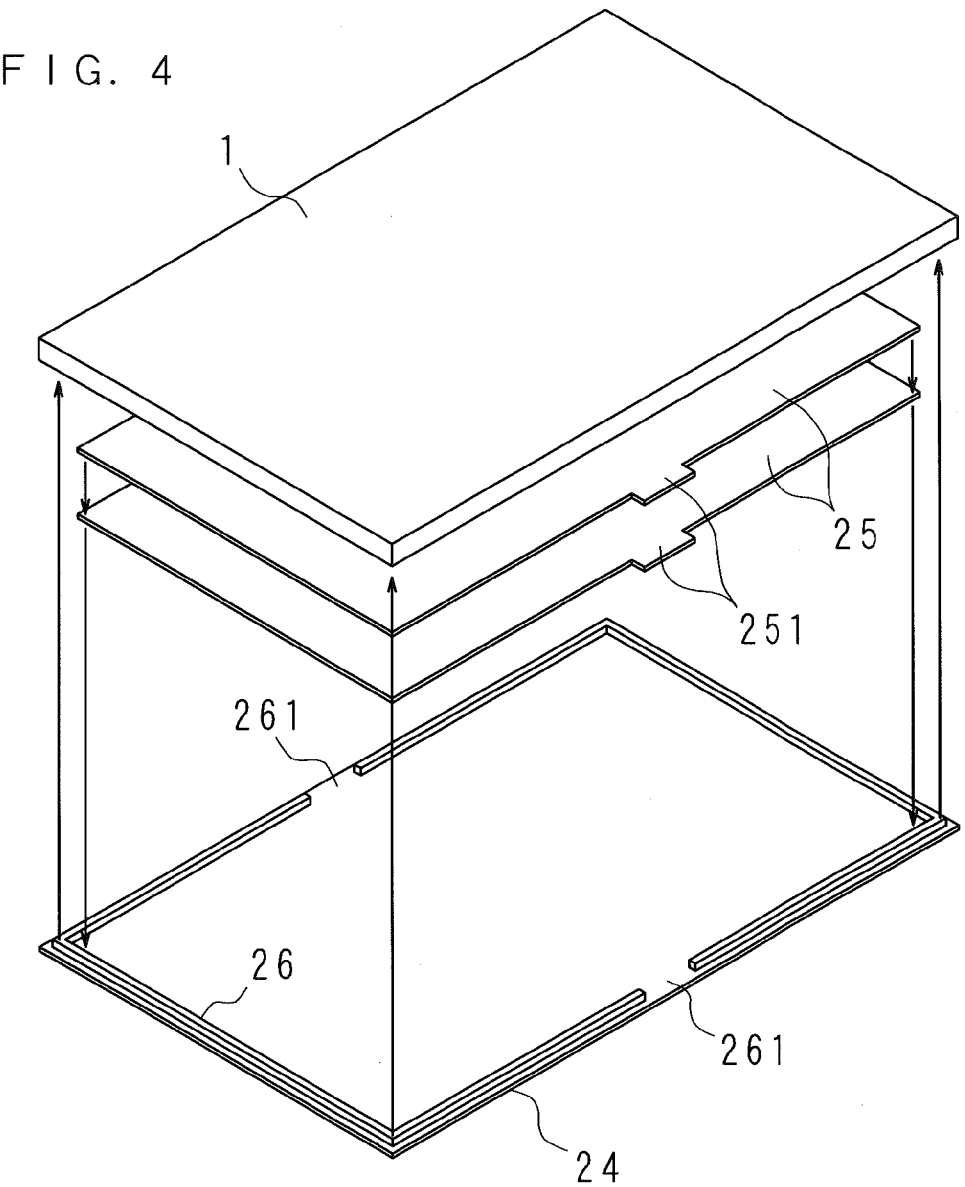
FIG. 4 is an explanatory view showing the mounting procedure of the diffusion sheet and the optical sheet.

FIG. 4 is an explanatory view showing the mounting procedure of the diffusion sheet 24 and the optical sheet 25. Hereinafter, configurations and functions other than configurations and actions described especially are the same as those in Embodiment 1 and are thus not described for the sake of simplicity. The display apparatus has a positioning structure 28 which positions the optical sheet 25 and the frame body 26. The optical sheet 25 is provided with positioning protrusions (protrusions or fitting protrusions) 251 protruding from the circumferential portion thereof outward on both long sides of the optical sheet 25, respectively. Two discontinuous parts 261 where a part of a circumferential direction of the frame body 26 is discontinuous (or absent) are provided in the frame body 26. The discontinuous parts 261 are arranged in positions corresponding to the positioning protrusions 251.

The positioning protrusion 251 is engaged with the discontinuous part 261, thereby positioning the optical sheet 25 in a plane direction. This allows an operator to mount the optical sheet 25 to the frame body 26 easily.

Figure 5A:
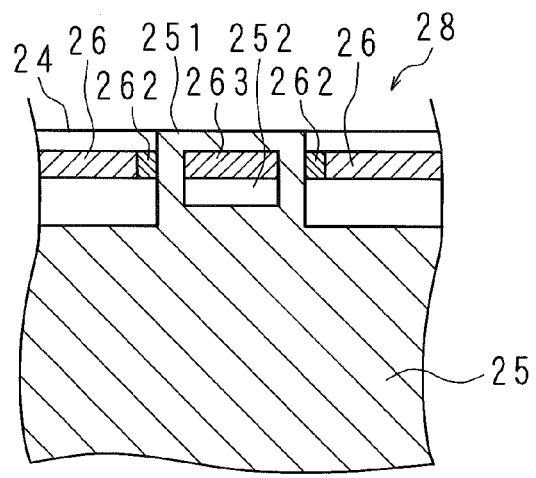
FIGS. 5A, 5B and 5C are enlarged sectional views showing examples of other shapes of positioning structures.
Figure 5B:
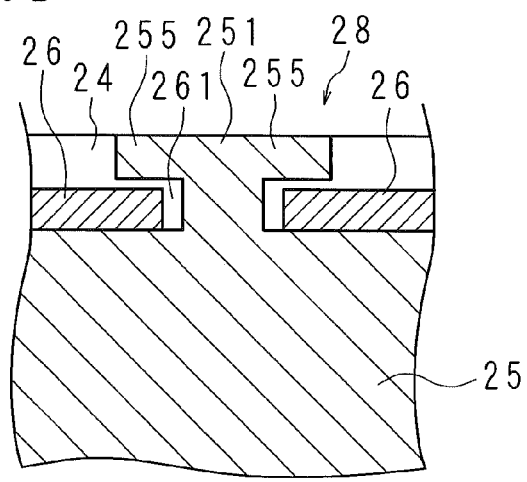
Figure 5C:
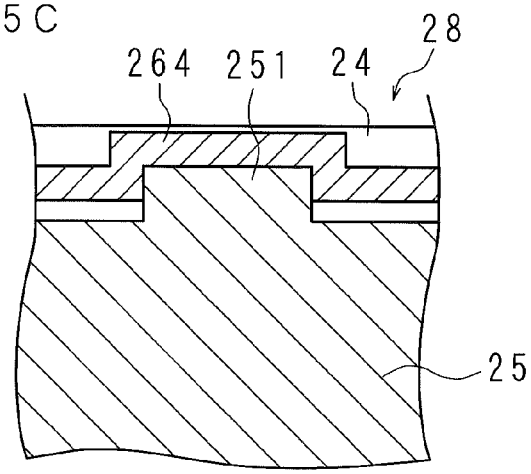

The positioning structure 28 is not limited to the above-described shape. FIGS. 5A, 5B and 5C are enlarged sectional views showing examples of other shapes of the positioning structures 28. As shown in FIG. 5A, the positioning protrusion 251 is provided with an insertion hole 252 which penetrates the optical sheet 25 in a thickness direction of the optical sheet 25. The frame body 26 is provided with a thin-walled part 262 which is thinner than other portions, and with a protrusion 263 which vertically protrudes with respect to a face of the optical sheet 25. A position of the protrusion 263 is matched with that of the insertion hole 252.

The protrusion 263 is inserted into the insertion hole 252, thereby positioning the optical sheet 25 in the plane direction. This allows an operator to mount the optical sheet 25 to the frame body 26 more easily.

As shown in FIG. 5B, the positioning protrusion 251 is provided with a locking part 255 which protrudes in a direction orthogonal to a protruding direction of the positioning protrusion 251. The positioning protrusion 251 is fitted into the discontinuous part 261 from a front face, and the optical sheet 25 can thereby be locked to the frame body 26.

The locking part 255 is locked to the discontinuous part 261, thereby the optical sheet 25 can be correctly positioned with respect to the frame body 26.

As shown in FIG. 5C, the frame body 26 is provided with a fitting recess 264 in an inner circumferential surface thereof. A position of the fitting recess 264 is matched with that of the positioning protrusion 251.

The positioning protrusion 251 is fitted into the fitting recess 264, thereby the optical sheet 25 can be positioned with respect to the frame body 26.

The display apparatus comprises no hole in the frame body 26. it is difficult for dust to enter between the optical sheet 25 and the diffusion sheet 24. This can prevent the shadow by the dust from being displayed on the front face of the liquid crystal panel 1.

Embodiment 3

FIG. 6 is a transverse sectional view by a line II-II of FIG. 1 and shows a left side of an upper face of the display apparatus. Hereinafter, configurations and actions other than configurations and actions described especially are the same as those in Embodiment 2 and their descriptions are thus not described for the sake of simplicity. Sizes of optical sheets 253 and 254 are substantially the same as that of the diffusion sheet 24. The optical sheet 253 is fixed to the liquid crystal panel 1 via a frame body 265. The optical sheet 254 is fixed to the optical sheet 253 via a frame body 266. The diffusion sheet 24 is fixed to a circumferential portion of the optical sheet 254 via a frame body 267. The liquid crystal panel 1, the frame bodies 265, 266, 267, the optical sheets 253, 254, and the diffusion sheet 24 can be fixed with a double-sided tape, an adhesive, etc.

Since the size of the optical sheet 25 is substantially the same as that of the diffusion sheet 24, the display apparatus emits light diffused near the circumferential portion of the optical sheet 25 to the circumferential portion of the liquid crystal panel 1, so as to display an image on the circumferential portion of the liquid crystal panel 1. This can narrow a width of a vertical direction or a lateral direction of the front cabinet 10 in the display apparatus.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

The invention claimed is:

1. A display apparatus, comprising:
a light source emitting light;
a display panel displaying an image on a front face of the display panel, and facing the light source; and
a diffusion section arranged between the light source and the display panel,
wherein the diffusion section comprises:
a diffusion sheet fixed to a circumferential portion of the display panel via a frame body, and facing the display panel with a distance between the diffusion sheet and the display panel, and
an optical sheet arranged in a gap between the display panel and the diffusion sheet,
wherein the diffusion sheet is suspended to the display panel by the frame body so as to be supported by the display panel,
a size of an outer circumference of the frame body is approximately the same as that of an outer circumference of the diffusion sheet, and
the frame body is fixed to a circumferential portion of the diffusion sheet by an adhesion layer.

2. The display apparatus according to claim 1, wherein the frame body includes a missing part formed by cutting a circumferential part of the frame body,
the optical sheet includes a protrusion which protrudes from a circumferential portion of the optical sheet outward, and
the protrusion is engaged with the missing part.

3. The display apparatus according to claim 2, wherein the protrusion includes a locking part which protrudes in a direction orthogonal to a protruding direction of the protrusion, and
the locking part is locked to the frame body.

4. The display apparatus according to claim 1, wherein the optical sheet includes an insertion hole,
the frame body includes a protrusion which vertically protrudes with respect to a face of the optical sheet, and
the protrusion is inserted in the insertion hole.

5. The display apparatus according to claim 1, wherein the optical sheet includes a fitting protrusion which protrudes from a circumferential portion of the optical sheet outward, and
the frame body includes a fitting recess, which s fitted onto the fitting protrusion, in an inner circumferential surface of the frame body.

6. The display apparatus according to claim 1, wherein a supporting member for supporting the diffusion sheet from a side of the light source is not provided.

7. A display apparatus, comprising:
a light source emitting light;
a display panel displaying an image on a front face of the display panel, and facing the light source; and
a diffusion section arranged between the light source and the display panel,
wherein the diffusion section comprises:
one or more optical sheets fixed to a circumferential portion of the display panel or a circumferential portion of one of the one or more optical sheets through one or more first frame bodies; and
a diffusion sheet fixed to a circumferential portion of one of the one or more optical sheets through a second frame body,
wherein the diffusion sheet is suspended to the display panel by the one or more first frame bodies and the second frame body so as to be supported by the display panel, sizes of outer circumferences of the one or more first frame bodies and the second frame body are approximately the same as those of outer circumferences of the diffusion sheet and the one or more optical sheets, and the second frame body is fixed to a circumferential portion of the diffusion sheet by an adhesion layer.

8. The display apparatus according to claim 1, wherein an entire of the frame body is disposed between the display panel and the diffusion sheet.

9. The display apparatus according to claim 7, wherein an entire of the first frame body is disposed between the display panel and the optical sheet, and an entire of the second frame body is disposed between the optical sheet and the diffusion sheet.

10. The display apparatus according to claim 7, wherein a supporting member for supporting the diffusion sheet from a side of the light source is not provided.

\* \* \* \* \*